Aug. 27, 1929.  C. H. LOEW  1,726,035
FILTER
Filed March 13, 1924    2 Sheets-Sheet 1
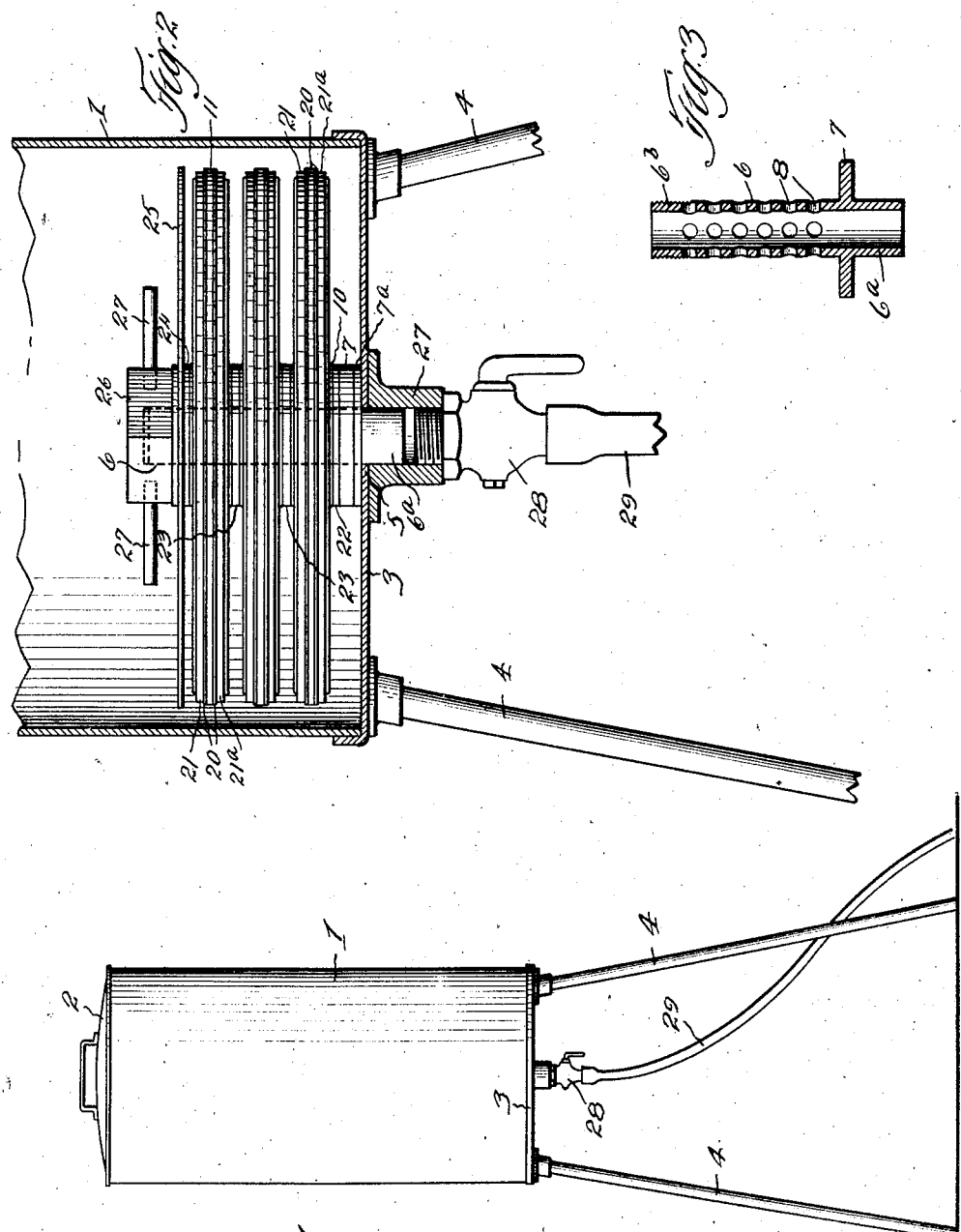

Aug. 27, 1929.  C. H. LOEW  1,726,035
FILTER
Filed March 13, 1924  2 Sheets-Sheet 2
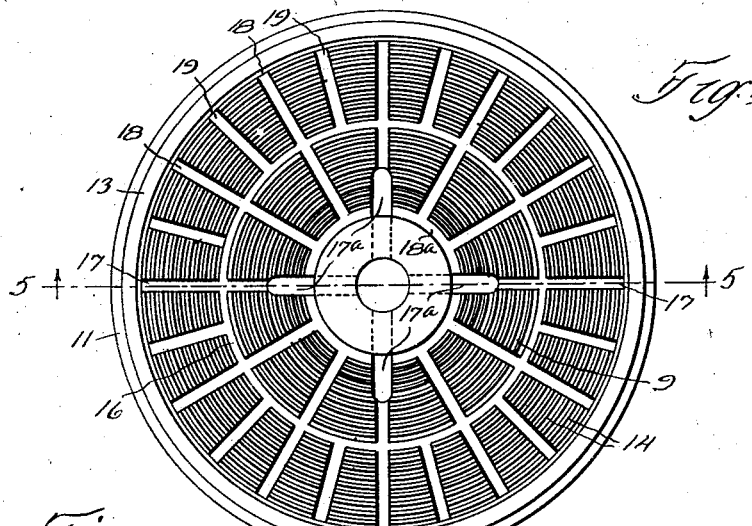
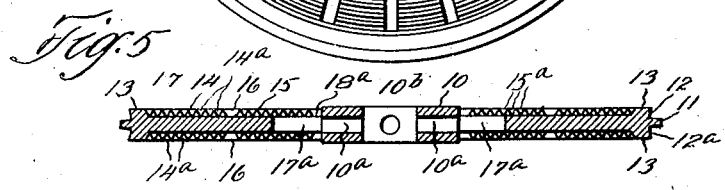
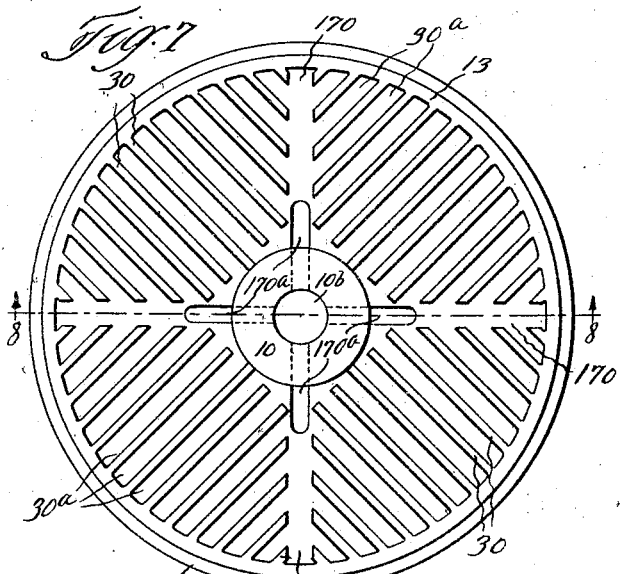
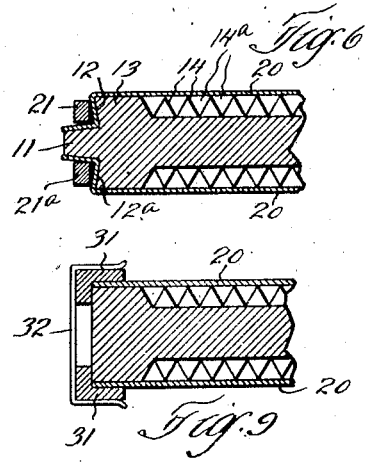
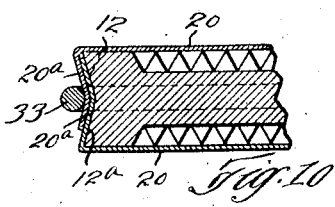
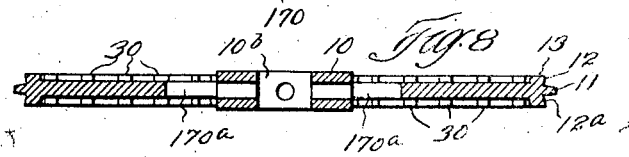

Patented Aug. 27, 1929.

1,726,035

UNITED STATES PATENT OFFICE.

CHARLES H. LOEW, OF AVON LAKE, OHIO; FRED BOMONTI, ADMINISTRATOR OF SAID CHARLES H. LOEW, DECEASED, ASSIGNOR TO THE LOEW FILTER COMPANY, OF CLEVELAND, OHIO, A CORPORATION OF OHIO.

FILTER.

Application filed March 13, 1924. Serial No. 698,866.

This invention relates to filters of the multiple-element type; also to the construction of the individual filtering elements thereof.

One of the objects of the invention is to provide a filter wherein the filtering elements are supported in an efficient manner whereby they may be conveniently assembled and removed.

A still further object of the invention is to provide filtering elements which are efficient in operation, as well as elements the parts of which are capable of being assembled and disassembled quickly and conveniently.

I accomplish the foregoing objects, and other objects which will appear hereinafter, in and through the construction and arrangement of parts shown in the drawings, wherein Fig. 1 represents a side elevation of a simple form of filter casing in which the filtering-element assembly may be enclosed; Fig. 2 a central sectional elevation through the lower part of the casing shown in Fig. 1, showing several of my filtering elements mounted therein; Fig. 3 a detail in vertical section through the central tube on which the filtering elements are mounted; Fig. 4 a plan view of one of the filtering elements; Fig. 5 a sectional view of the same corresponding to the line 5—5 of Fig. 4; Fig. 6 a detail in section showing the manner in which the filtering media are applied to the elements; Fig. 7 a view similar to Fig. 4, of a modified form of filter plate; and Fig. 8 a view, similar to Fig. 5, corresponding to the line 8—8 of Fig. 7; and Figs. 9 and 10 views, similar to Fig. 6, showing modifications of the manner of securing the filtering media to the filter plates.

Describing the parts by reference characters and in connection with Figs. 1 and 6, inclusive, 1 denotes a cylindrical receptacle having a cover 2 and a bottom 3 which is supported by a plurality of legs 4. The bottom 3 is provided with a central aperture 5 which receives the lower end $6^a$ of a tube 6, the tube being supported upon the bottom 3 by means of a flange 7 and a washer $7^a$ interposed between such flange and the bottom. The tube is provided with vertically spaced series of apertures 8. The apertures of each series have their centers in substantially the same plane, at right angles to the axis of the tube 6; and four such apertures are shown in each series, being arranged 90° apart, in order to cooperate with the ports in the hub of the filter element which is associated with each such series. The upper end of the tube 6 is provided with a thread, indicated at $6^b$.

The length of the tube and the number of the series of apertures 8 will vary with the number of filtering elements employed, and hence with the capacity of the filter. In Fig. 2, only three such elements are shown, but this number is merely illustrative.

Each filtering element comprises a filter plate and the filtering media applied thereto. One of these plates is shown in detail in Figs. 4, 5 and 6, to which reference will now be made for a detailed description.

Each plate, shown in side elevation in Fig. 2, comprises generally a body 9, preferably circular in outline and having a central hub 10 which is of greater width than the thickness of such body whereby it projects beyond the lateral surfaces of such body. The periphery of such plate is provided with a central radially extending circumferential rib 11, it being noted that the upper and lower surfaces of such rib converge toward each other outwardly and that the periphery of such plate, both above and below such rib, is in the form of two reversely extending cone frusta 12, $12^a$, each having its smaller base adjacent to the rib.

Each plate is provided, immediately within and adjacent to the upper and lower ends of the surfaces 12 and $12^a$, respectively, with a horizontal annular ledge 13. Between the hub 10 and the ledge 13, the upper and lower faces of the plate are provided each with an outer series 14 and an inner series 15 of circular tapered ribs, the series being separated by an annular recess 16. Between the ribs 14 and 15, circumferential channels $14^a$ and $15^a$, respectively, are provided. A series of radial shallow channels 17 extend between the hub 10 and the ledge 13 on each face of the filter plate. The upper and lower channels 17 merge at their inner ends with through channels $17^a$, each of which communicates at its inner end with a radial passage $10^a$ extending to the center of the hub and communicating with the central bore 10$^b$ thereof. The channels 17 are shown as 90° apart. Between each pair of adjacent channels are two radial channels 18, spaced approximately 30° apart and from the channels 17 respectively adjacent thereto, the said channels 18 extending from the ledge 13 on each face thereof to an annular channel 18$^a$ surrounding the hub.

Intermediate of the channels 18 and also intermediate of the channels 17 and the channels 18 are the short radial channels 19, the last mentioned channels extending only from the ledges 13 to the annular recess 16. The arrangement of the channels 19 is such that each channel has another channel spaced preferably 15° therefrom. To the upper and lower faces of each filter plate, I apply filtering media. For such media, I preferably use filter paper, applying a disk 20 of such paper to the upper surface of each plate and a similar disk 20 to the lower surface of each plate. The centers of the filter paper disks are supported on opposite sides of the hub 10 and the disks extend outwardly across the channels, across the ledges 13 by which they are supported, and are folded down along the surfaces 12 and 12$^a$ and along the opposite sides of the rib 11. They are preferably secured at their outer ends by means of an upper friction clamping ring 21 and a lower friction clamping ring 21$^a$, which are pressed over the top and bottom edges of the ledges 13. These rings are not shaped to conform to the surfaces 12 and the surfaces of the rib 11 with which they coact, as will appear in Fig. 6, the inner and outer surfaces of the said rings being cylindrical. This insures a line contact between one edge of each ring and its filtering medium, which is drawn over the surface 12 or 12$^a$, and a like line contact between the edge of the ring and the filtering medium which is drawn over the adjacent face of the rib 11.

As the filtering elements, formed by assembling the filtering media upon the plates, are to be placed upon the tube 6, the centers of the filtering media will be removed so as to provide openings registering with the bores 10$^b$.

As many of the filter elements thus constructed will be assembled upon the tube 6 as are necessary to secure the desired capacity in the filter. The elements are shown as assembled with the hub of the lowermost element resting upon a suitable spacing washer 22, on the flange 7. As many elements as desired, or as the tube 6 will accommodate, will be assembled, the elements being spaced apart by washers 23, the parts being so proportioned that the radial ports 10$^a$ of each hub will communicate with a series of openings 8 in the tube.

When the last filtering element has been applied to the top of the tube, a suitable number of spacing washers will be applied to the tube above such element, and a baffle plate 25 will then be applied to the tube above such washer, the said plate extending preferably as far as the periphery of the filtering element therebeneath. The parts will then be secured in place by means of a cap 26 threaded on top of the tube and provided with handles 27. By screwing up the cap, the elements and the plate 25 will be clamped in assembled position and the central portions of the filter papers or other filtering media will be securely held in place.

The lower end 6$^a$ of the tube projects into a connection 27 which is shown as provided with a valve 28 to which a pipe 29 is secured for delivering the filtered liquid to the point of use.

In the operation of the filter, the liquid to be filtered is poured into the top of the receptacle 1, the plate 25 serving to protect the uppermost member from the impact of such liquid.

The liquid passes through the filter papers and by means of the channels 14$^a$, 15$^a$, 16, 17, 18, 19, 18$^a$ and the passages 17$^a$ and 10$^a$ to the tube 6, being delivered from said tube when the valve is opened.

When the circular ribs 14 and 15 are employed without channels such as 18 and 19 being employed, it is found that air will work under the filter paper disks 20 and between the same and the filter plate and thus impair the efficiency. By the use of these radial channels, however, it has been found that the passage of air is prevented and that the filter will act most efficiently. It has also been found that the efficiency of the filter is enhanced by the use of the flat supporting ledges 13 for the peripheral portions of the disks 20.

By using a pair of clamping rings such as the rings 21, 21$^a$, in connection with the periphery of the filter plate, the cloth on each side of such plate can be stretched tight while applying the rings thereto and the rings be enabled to hold the cloth in such stretched condition. This enables the reversal of the flow of liquid through the filter plates, for the purpose of removing from the outer surfaces of the filter cloths the sediment that may have collected thereon, without any material bulging of the cloths, which would otherwise cause a contact between the cloths on adjacent sides of the assembled filter plates such as would prevent the sediment removing action referred to.

In Figs. 7 and 8, there is shown a modification of my invention wherein the circular ribs 14 and 15 are dispensed with. In this form of the invention, the peripheral portion of the filter plate is formed in the same manner as in the preceding views; also four channels 170, resembling the channels 17, extend from the ledges 13 on opposite side of the plate to the through passages 170ᵃ, which communicate with the interior of the hub 10. Each quadrant on each face of the plate included between adjacent channels 170ᵃ is provided with parallel ribs 30 having channels 30ᵃ therebetween, and the central rib in each quadrant extends radially to the hub, the other ribs terminating short of the hub and of the channels 170.

This arrangement of ribs and channels, as well as that shown in Figs. 4 and 5, insures the absence of air bubbles beneath the filter disks 20; and both forms of plates secure a maximum filtering capacity.

In Fig. 9, there is shown a modification of the filter element shown in Figs. 1 to 6, wherein the disks 20 are secured to the peripheral portion of the plate by means of upper and lower angular rings 31 and channel-shaped clips 32.

In Fig. 10, there is shown a still further modification of the filtering element, wherein the periphery of the plate is formed in the same manner as in the case of Figs. 4—8, except that the rib 11 is omitted and the surfaces 12 and 12ᵃ meet at the vertical center of the plate. The peripheral portions 20ᵃ of the filtering disks in this case are folded nearly across the periphery of the plate, the peripheral portion of one of the disks overlapping that of the other; and such portions of the disks are secured in place by means of a circular spring clamping ring 33 engaging the overlapping parts of the disks and fitting into the central depression provided in the periphery of the plate.

The filter plates disclosed herein give each an extended channel-area for the liquid filtered thereby and provided, with the filtering media applied thereto, filtering elements each of very great capacity in comparison with the area of the plate.

Having thus described my invention, what I claim is:—

1. A filter plate comprising a hub having a bore and a body surrounding said hub, the said body having a marginal ledge on each side thereof and the said plate being provided with channels on each side thereof for conducting filtered liquid inwardly from the marginal portion thereof toward the hub and with passages communicating with such channels and with the bore of said hub, filtering material applied to opposite faces of the said plate and extending from the hub outwardly over the marginal ledges, the said plate being provided with circumferential ribs between the marginal ledges and the hub and with an annular channel intermediate each marginal ledge and the hub and also with an annular channel on each side thereof surrounding the hub, there being radially extending channels between the ledges and the hub and intersecting the circumferential ribs and the said annular channels and communicating with the said passages.

2. A filter plate comprising a hub having a bore and a body extending outwardly from said hub, the said body having a marginal ledge on each side thereof and being provided with radial channels extending on each side thereof from such ledge to an annular channel surrounding said hub and with other radial channels extending on each side thereof from such ledge and each communicating at its inner end with a passage which intersects the annular channel and communicates with the bore of said hub, the said plate also having an annular channel interposed between the first mentioned annular channel and the marginal ledge, on each side of such plate, with radial channels extending from each marginal ledge to the second annular channel, the said plate also having circumferential ribs on each side thereof interposed between the marginal ledge and the hub, filtering material applied to opposite faces of the hub and extending from the hub outwardly over the marginal ledges, and means for securing the marginal portions of said filtering material to the marginal portion of the plate.

3. A filter plate comprising a hub having a bore and a body surrounding the said hub, the said body being of circular outline and having a central radially extending circumferential rib approximately midway between the peripheral side edges thereof, with a clamping surface extending radially outwardly from each side of said rib toward a side edge of said body, the said body having channels for conducting filtered liquid inwardy from the peripheral portion of said body toward the bore of said hub, filtering material applied to opposite faces of the said plate, and a pair of friction rings clamping such filtering material to the surfaces on opposite sides of the said rib.

4. A filter plate comprising a hub having a bore and a body surrounding the said hub, the said body being of circular outline and having a central radially extending circumferential rib approximately midway between the peripheral side edges thereof, the said rib having opposite surfaces which diverge toward the peripheral portion of said body and the said body having a clamping surface extending radially outwardly from each side of said rib toward a side edge of said body, the said body having channels for conducting filtered liquid inwardly from the peripheral portion of said body toward the bore of said hub, filtering material applied to opposite faces of the said plate, and a friction ring on each side of the said rib and each having a line contact with the filtering material and serving to press such material against the clamping surface at the side of the rib on which such ring is applied.

5. A filter plate comprising a hub having a bore and a body surrounding the said hub, the said body being of circular outline and having a central radially extending circumferential rib approximately midway between the peripheral side edges thereof, with a clamping surface extending radially outwardly from each side of said rib toward a side edge of said body, the said body having an annular clamping surface on each side thereof and extending inwardly from the periphery thereof, the said body having channels for conducting filtered liquid inwardly from the peripheral portion of said body toward the bore of said hub, filtering material applied to opposite faces of the said plate, and a pair of friction rings clamping such filtering material to the surfaces on opposite side of the said rib.

6. A filter plate comprising a hub having a bore and a body surrounding the said hub, the said body being of circular outline and having a central radially extending circumferential rib approximately midway between the peripheral side edges thereof, the said rib having opposite surfaces which diverge toward the peripheral portion of said body and the said body having a clamping surface extending radially outwardly from each side of said rib toward a side edge of said body, the said body having an annular clamping surface on each side thereof and extending inwardly from the periphery, the said body having channels for conducting filtering liquid inwardly from the peripheral portion of said body toward the bore of said hub, filtering material applied to opposite faces of the said plate, and a pair of friction rings for clamping such filtering material, the inner surface of each of said rings being cylindrical, thereby enabling one edge of such surface to press the filtering material against a surface of said rib and the other edge to press the said material against the peripheral side edge of said body.

7. A filter plate comprising a hub having a bore and a body surrounding said hub, the body being provided on opposite sides thereof with ribs and channels between said ribs leading to and discharging into the bore of said hub, the periphery of said body being provided with a rib located between the top and bottom thereof, filtering material applied to opposite faces of the said plate, and a friction ring applied to the periphery of the said plate, on each side of the rib thereof, and clamping the filtering material to the periphery of said plate and on opposite sides of the said rib and under tension across the top and bottom peripheral edges of said plate.

8. A filter plate comprising a hub having a bore and a body surrounding said hub, the body being provided on opposite sides thereof with ribs and with channels between said ribs leading to and discharging into the bore of said hub, the said body having a wide periphery, filter cloths applied to opposite surfaces of said plate, and friction clamping rings applied to the periphery of the said plate adjacent to the top and bottom of said plate, respectively, and clamping under tension across the peripheral edges of the plate the corresponding peripheral portions of the filter cloths on the top and bottom of said plate.

In testimony whereof, I hereunto affix my signature.

CHARLES H. LOEW.